United States Patent Office 3,476,597
Patented Nov. 4, 1969

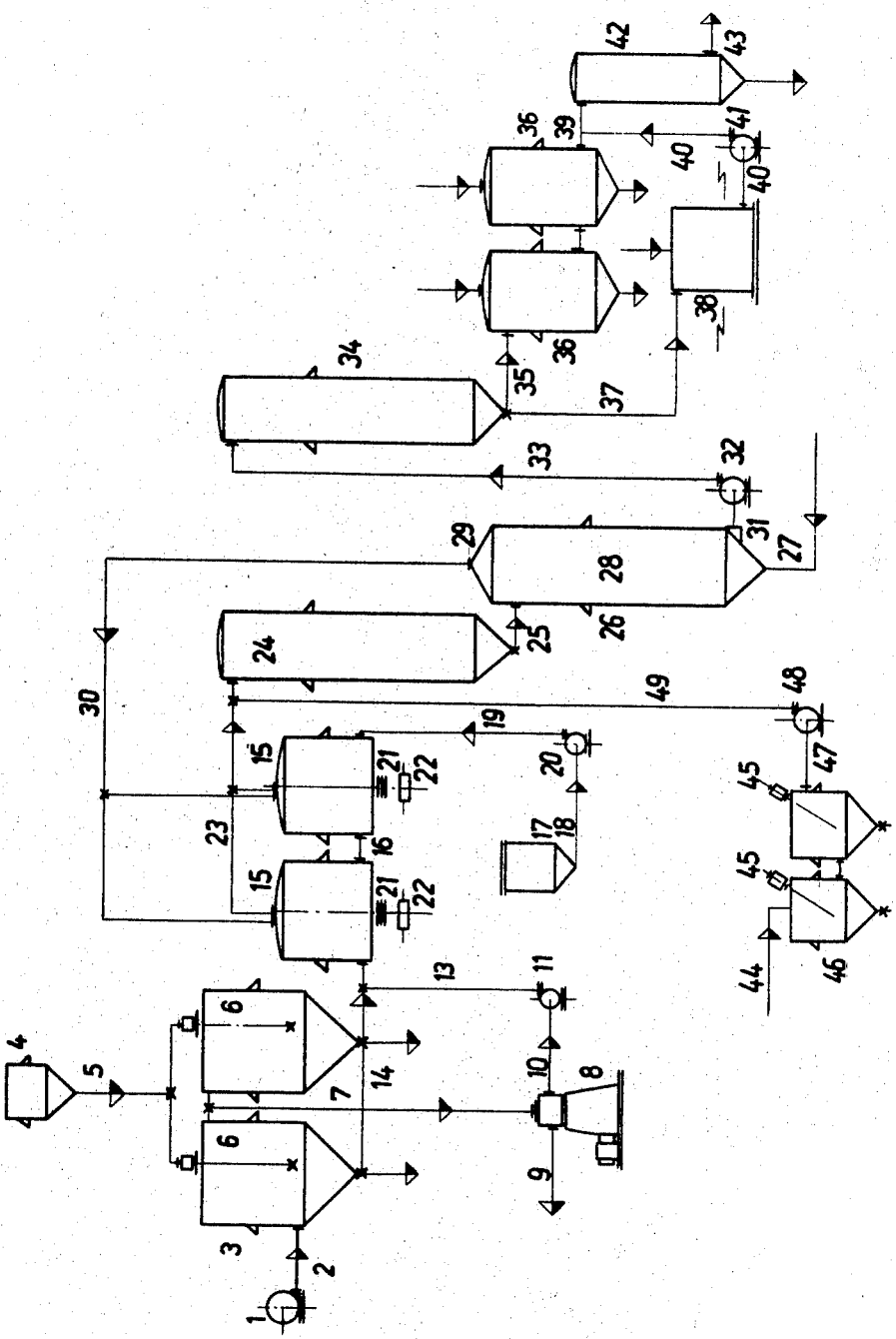

3,476,597
METHOD AND MEANS FOR PURIFYING, DISCOLORING AND CLARIFYING THROUGH A CONTINUOUS AND CATALYTIC TREATMENT AT ROOM TEMPERATURE RAW SUGAR JUICES OBTAINED FROM SUGAR CONTAINING PLANTS AND FRUIT AND ALSO RAW SUGAR SOLUTIONS
Friedrich Georg Lippe, Cologne-Deutz, Germany (4 Niddastrasse, 6236 Eschborn, Taunus, Germany) and Fritz Suppan, Cologne, Germany (Breslauerstrasse 12, Luisdorf uber Troisdorf, Germany)
Filed Feb. 10, 1966, Ser. No. 526,539
Claims priority, application Germany, Feb. 17, 1965, R 39,925
Int. Cl. C13d 3/00; B01d 13/00
U.S. Cl. 127—48          7 Claims

ABSTRACT OF THE DISCLOSURE

A method for purifying raw sugar juices at room temperature comprising incorporating in the raw sugar juices at substantially room temperature at a pH approximating 7 a solution comprising 1% of the extract of a plant of the umbellifer family.

---

Methods are already known and applied in practice for purifying, decolorizing and clarifying raw sugar juices.

Generally, such methods resort to the precipitation and clarification of products of a mineral nature, the efficiency of which requires a heating of such juices or solutions.

It is possible to resort, for such purposes, to precipitating reagents such as quick lime as provided by roasted lime stone or lime wash or again salts of other bivalent or trivalent metals.

The excess of lime has to be removed through saturation by means of carbonic gas or sulfurous anhydride. The salts may be removed to a large extent by means of ion exchangers.

The heating of the solution suffers from the drawback in that the cations of the different metal salts form with the raw sugar saccharates which are not decomposed during the saturating procedure and which remove, by reason of their greater solubility, a fraction of the saccharose due to the subsequent procedure of settling through clarification.

The albumen which is not carried away by the decomposition produced by the lime or by the settling of salts; a fraction of the coloring material remaining in the diluted clarified juice and the monosaccharides and the saccharates which prevent complete crystallisation, combine to form the products termed molasses, which constitute, by reason of the partial formation of caramel, a residuum having a brownish colour.

The thermal treatment of the juices within a range of temperatures ranging above 20° C. furthers also the partial inversion of the saccharose, more particularly within an acid medium.

The complete operative procedure requires an accurate and uninterrupted control, so as to allow maintaining the desired alkalinity of the solution through incorporation of basic products if required.

The execution of such a procedure requires a large expenditure of energy, equipment and time.

However, it is possible to thus obtain only diluted juices the concentration and settling of which through crystallisation allows the formation only of a comparatively reduced mass of sugar adapted to be marketed.

The present invention has for its object a method, the application of which allows the obtention without the addition of mineral settling and clarifying reagents and without any heating diluted colorless and odorless solutions containing no albumen. By reason of their greater purity, the solutions may be concentrated by a mild heating or by evaporation of the contained water, or by a partial freezing of the water, whereby it is possible to obtain a perfectly white product constituted by the totality of the sugar which settles through crystallisation.

The invention consists chiefly in treating advantageously at low temperature a raw juice which has been obtained at room or at raised temperature and which generally shows a pH lower than 7 with a 1% solution of a product which may be found for instance in extracts of plants of the umbellifer family. A modification of the value of the pH may serve for adjusting the speed of settling.

Hereinafter is described by way of example a manner of obtaining such an extract.

The plants of Levisticum officinale which have been previously cut are chopped and ground in a disintegrator so as to produce a pulp. The pulp is then washed inside a washer by jets of water or the like suitable solvent flowing in countercurrent relationship, whereby an extract is obtained containing about 20% of dry product. Said extract is diluted before use or else if not diluted, it is incorporated with the sugar juice to be purified in a lesser proportion so as to take into account the concentration of the extract.

When the sludge has been separated through flocculation, a first separation or filtration is performed by means of conventional apparatus.

The raw juice which has been previously filtered or a solution of raw sugar is subjected to a filtering in a polyamidic filter, so as to ensure a more complete filtration together with an elimination of a fraction of phenolic and nitrogenic compounds.

This being done, the raw juice of the solution of sugar is caused to pass through a column filled with a catalyst containing advantageously a metal oxide or hydroxide, the support of the catalyst being constituted for instance by a silica or alumina gel.

The compounds containing raw sugar which cannot be filtered and which cannot be readily dissociated are transformed so as to form a complex compound which may be removed through subsequent filtration and exchange of ions.

With a view to starting and accelerating the procedure, air is introduced continuously in countercurrent relationship, said air carrying ozone so as to cut out all germs.

The diluted sterilized juice or the solution of sugar is introduced a second time into the polyamidic filter before the clarified juice is fed into a ion exchanger or into an electrodialysis apparatus with a view to removing the residual salts naturally contained at the start in the raw juice and also to removing the transformed products obtained.

The slight possible amount of persistant residuary phenolic components still carried by the juice is finally removed by means of a cation exchanger carrying Fe III ions.

The diluted juice obtained or the sugar solution formed after the treatment which has just been described is perfectly pure, clear, colorless and odorless.

In order to reduce the amounts of products circulating in the system, it is possible to proceed after filtration and before treatment inside the catalytic column to a concentration of the juice or of the solution so as to double its concentration figure.

The final concentration of the solution and the settling through clarification of the dissolved product may be obtained through a mild evaporation of the water contained therein.

The single figure of the accompanying drawing illustrates by way of example an embodiment of the system provided for the execution of the improved method according to the invention.

As illustrated, it is apparent that the pump 1 delivers the raw juice through the channel 2 into the containers 3; said containers 3 are filled and emptied in alternation so that the products may stay therein during a period equal to that required for the flocculation of the impurities.

The vegetable flocculating reagent is introduced into the raw juice, said reagent being fed out of the vat 4 and entering through the pipe 5 into the containers 3 provided with stirrers 6.

The suspension which forms in an upper section of the containers 3 is delivered through the pipe 7 into the separator 8, so as to be centrifugally removed. The suspension thus removed centrifugally is exhausted through the pipe 9 opening into the separator.

The remaining solution passes out of the separator through the pipe 10 towards the pump 11 delivering it into the pipe 13 opening into the pipe 14 which feeds the raw juice containing no more flocculated products into the settling filters 15 which are interconnected by the pipe 16.

An auxiliary filtering reagent is fed out of the vat 17 into said filters 15 through the pipes 18 and 19 under the action of the pump 20.

The sludge which has been filtered out in the filters 15 is exhausted at 21 and carried away over endless conveyor strips 22. The roughly filtered raw juice passes through the pipe 23 out of the filters 15 into the polyamidic filter 24 and then out of the latter through the pipe 25, so as to feed into the catalyzing column 26 a completely filtered diluted juice. Air which has been sterilized by ozone is blown into said catalyzing column through the connection 27. The air passing through the catalyst 28 inside the column passes at 29 out of the catalyzing column and is returned through the pipe 30 into the filter 15 so as to maintain said filters in a sterile conditions by means of the residual ozone carried by said air.

The catalytically treated juice flows at 31 out of the column 26, so as to be delivered into the polyamidic filter 34 through the pipe 33 by the pump 32. The diluted, clear and perfectly filtered juice passes then out of the polyamidic filter 34 through the pipe 35 which leads the juice to the ion exchanger 36 where it is completely released or else said clear juice is fed out of 34 through the pipe 37 into the electrodialyzing apparatus 38 which cuts out at least a fraction of its salts.

The decolored and perfectly clarified juice passing out of the ion exchanger 36 into the pipe 39 or else out of the electrodialyzing apparatus 38 into the pipe 40 and the pump 41 enters the cation exchanger 42 carrying Fe III ions and beyond which it leaves the purifying system through the pipe 43.

In the case of sugar solutions containing raw sugar, the latter is introduced at 44 into solvent containers 46 provided with stirrers 45. The solution passes out of the solvent containers through the pipes 47 and is delivered by the pump 48 into the pipe 49 and then through the pipe 23 into the polyamidic filter 24. The sugar solution passes then out of the polyamidic filter through all the apparatus and pipes following it and is finally exhausted at 43 out of the purifying system.

What we claim is:

1. In a method for purifying raw sugar juices at room temperature, the improvement consisting essentially of incorporating in said raw sugar juices at substantially room temperature at a pH approximating 7 a solution comprising 1% of the product obtained by the solvent extraction of a plant of the umbellifer family.

2. The method of claim 1 wherein the extract is obtained from *Levisticum officinale*.

3. The method of claim 1, including the step of subjecting the catalytically treated juices and solutions to the action of an ion exchanger.

4. The method claim 1, including the step of subjecting the catalytically treated juices and solutions to the action of dialysis.

5. The method of claim 1, consisting in filtering the purified juices on polyamides to separate a fraction of the phenolic and nitrogen-containing compounds and catalytically treating the filtered juices and solutions over catalysts selected from the group consisting of metal oxides and hydroxides adapted to transform the non-filtrable and non-dissociatable impurities into filtrable and precipitable compounds.

6. The method of claim 5, including the step of blowing over the juices and solutions subjected to catalytic reaction a stream of ozone-carrying air in countercurrent relationship.

7. The method of claim 5, including the step of subjecting the catalytically treated juices and solutions to the action of Fe III ions.

References Cited

UNITED STATES PATENTS

| | | | |
|---|---|---|---|
| 573,355 | 12/1896 | Pridham | 127—9 |
| 1,538,004 | 5/1925 | Ricard | 127—48 |
| 2,501,272 | 3/1950 | Godston | 127—48 |
| 2,515,353 | 7/1950 | Naugle | 127—48 |
| 2,567,836 | 9/1951 | Anthes | 127—46 X |
| 2,688,572 | 9/1954 | Warshaw | 127—10 X |
| 2,728,724 | 12/1955 | Gloor | 127—48 X |
| 2,874,132 | 2/1959 | Riener | 127—46 X |
| 2,955,963 | 10/1960 | Itin et al. | 127—48 X |

OTHER REFERENCES

"Sugar Industry Abstracts," Tate and Lyle, London, 19:128, 579, Vaillant (1957); 20:22, 89, Chatterjee et al. (1958); 22:131, 540, Joshi et al. (1960).

MORRIS O. WOLK, Primary Examiner

D. G. CONLIN, Assistant Examiner

U.S. Cl. X.R.

127—11, 46, 50, 55; 460—195